Nov. 22, 1960 — A. REINHARDT — 2,961,018
SAWING AND SORTING STAND
Filed March 2, 1959 — 2 Sheets-Sheet 1
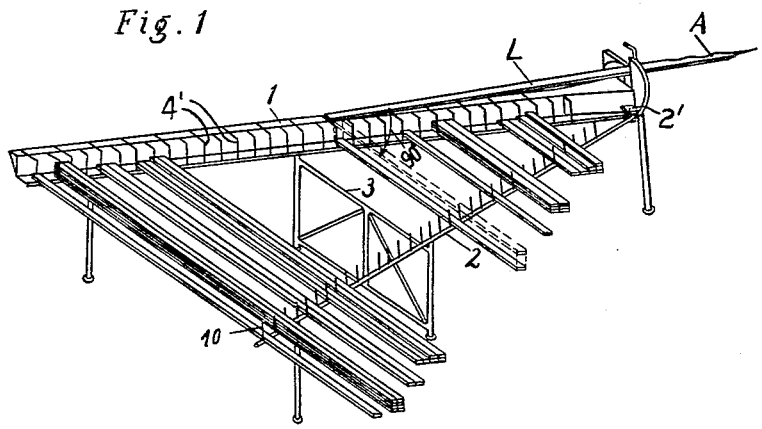
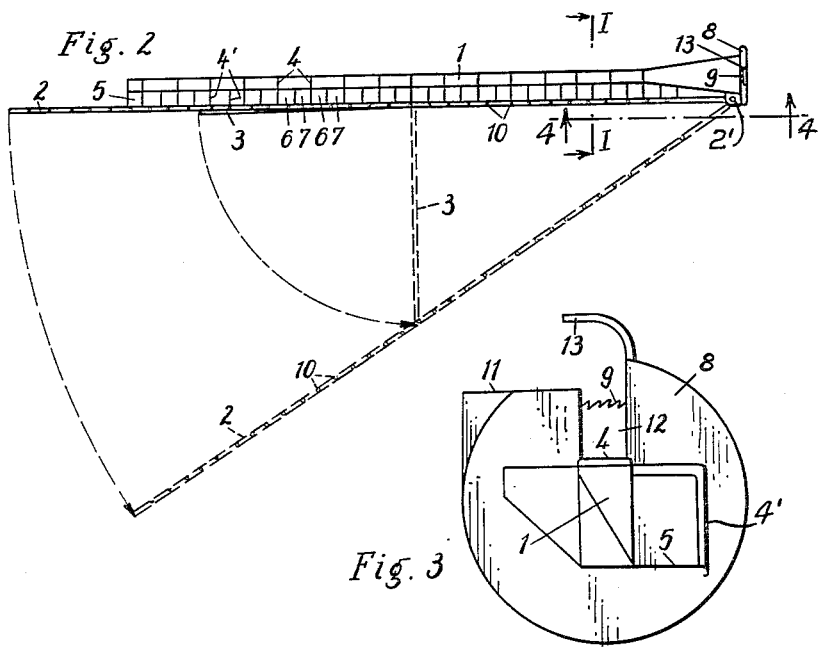
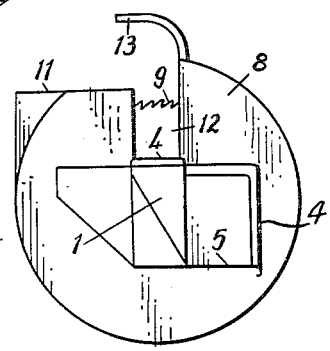
INVENTOR
ALFONS REINHARDT
BY Dicke and Craig
ATTORNEYS

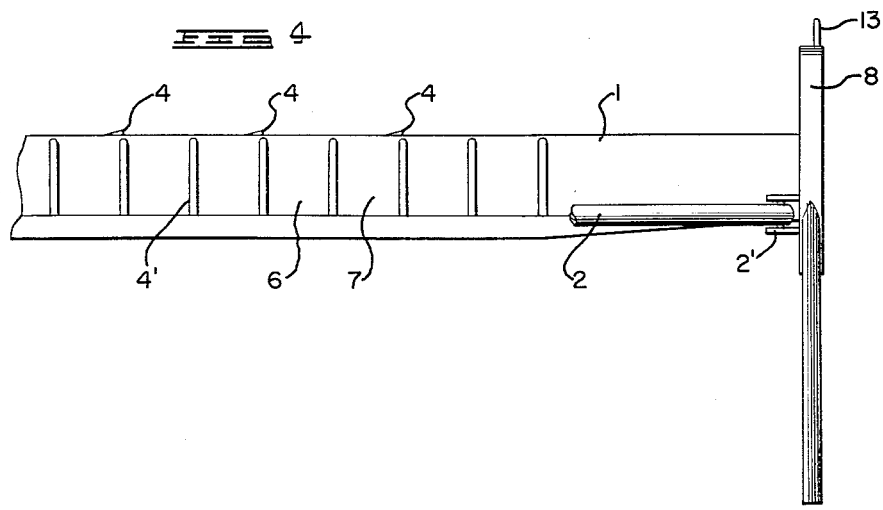
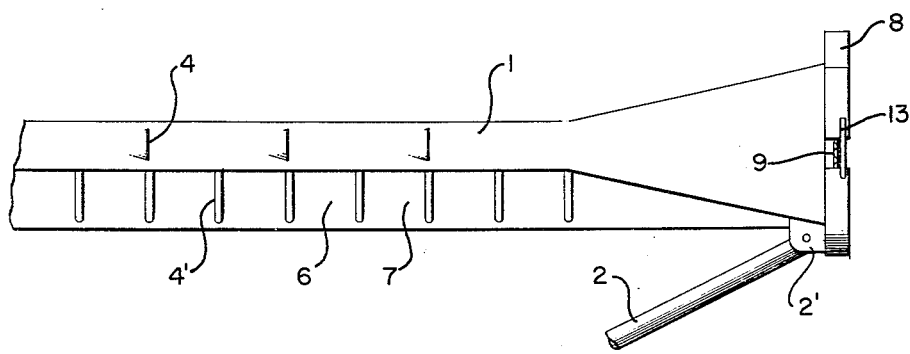

United States Patent Office 2,961,018
Patented Nov. 22, 1960

2,961,018

SAWING AND SORTING STAND

Alfons Reinhardt, Alte Hauptstrasse 39, Schomberg, Kreis Balingen, Germany

Filed Mar. 2, 1959, Ser. No. 796,437

Claims priority, application Germany Mar. 5, 1958

8 Claims. (Cl. 143—157)

The present invention relates to a crosscut saw with a sizing and stacking device for cutting, assorting, and stacking boards and slats of wood or similar materials of unassorted unequal lengths into stacks of boards or slats of commercial sizes.

Crosscut saws used for this purpose prior to this invention were usually provided with a sizing board with measuring stops arranged at certain distances from each other. The operator then had to note the exact length of each board or strip cut as determined by the respective measuring stop and then stack the slats according to such length. Such assorting and stacking required a considerable length of time and rendered the whole operation very uneconomical.

It is an object of the present invention to provide a crosscut saw with a simple and inexpensive sizing and stacking device which permits the sizing and stacking operations to be carried out very easily and quickly and without any danger of error.

The crosscut saw according to the invention is provided with a sizing bar, the various measuring stops of which serve for assorting the slats cut according to their length and for also stacking them in separate piles according to their length. For this purpose, each measuring stop is associated with a sorting and stacking compartment, and these compartments are, in turn, associated with a rakelike device for supporting the free ends of the slats.

In the operation of the new crosscut saw, the cut ends of the boards or slats facing toward the saw blade are pivoted about the respective measuring stop used and then laid between the prongs of the rake-shaped support corresponding to such stop and at the same time slipped into the respective stacking compartment associated with the measuring stop. The entire assorting and stacking operation therefore requires merely one pivotal movement of the slat or board after it has been cut.

The rake-shaped support is preferably pivotably connected to the sizing bar so as to permit the entire device to be set up very quickly and to be easily transported. When this support is pivoted outwardly of the sizing bar it will rest upon a transverse supporting stand which is likewise pivotably connected to the sizing bar. This supporting stand is provided with a plurality of prongs with intermediate spaces in accordance with the number of sorting compartments on the sizing bar. These sorting compartments extend laterally and downwardly of the measuring stops along the sizing bar and form open pockets underneath the plane of the supporting surface on which the strips are measured and cut. Each measuring stop is preferably associated with a pair of sorting compartments.

The saw blade of the new crosscut saw is covered by a hood or guard with a vertical slot therein for the insertion of the slats to be cut and a horizontal place of support for the slats at the bottom of the vertical slot. One edge of the slot is extended upwardly by a curved guide arm which permits the slats to be inserted only from one side into the slot.

In the operation, the board or slat to be cut is placed upon the sizing bar between the respective measuring stop and the saw and upon the horizontal supporting surface of the hood underneath the curved guide arm, whereupon the slat is pressed upon the saw blade and cut off.

According to another feature of the invention, the guide arm is slightly offset relative to the saw blade in the direction toward the slat end to be cut off and discarded, so that the board or slat after being cut may be lifted out of the vertical slot in the hood and then pivoted past the guide arm about the particular measuring stop used and into the sorting and stacking compartment associated with such measuring stop, while the newly cut end of the slat is placed in the gap between two prongs of the rakelike support which corresponds to the particular stacking compartment. For transporting the entire device, the rakelike support as well as its transverse pedestal may be pivoted flatly against or underneath the sizing bar, respectively.

These and other objects, features, and advantages of the present invention will be further apparent from the following detailed description thereof, particularly when read with reference to the accompanying sheet of drawings, in which Figure 1 shows a perspective view of the sawing and sorting stand with the sorting and stacking device in the operative position;

Figure 2 shows a plan view of the sawing and sorting stand with the sorting and stacking device in the folded-down position for transport or storage;

Figure 3 shows an enlarged cross section taken along line I—I of Figure 2;

Figure 4 shows an enlarged side elevation partly broken away of the right hand end of the sawing and sorting stand as viewed in Figure 2, while Figure 5 shows a plan view corresponding to Figure 4.

Referring to the drawings, the crosscut saw with its sorting and stacking device according to the invention comprises a sizing bar 1 which is preferably made of sheet metal with tubular feet thereon for supporting the boards or slats to be cut. This sizing bar 1 is provided with a plurality of measuring stops 4 which are spaced at certain distances from each other in accordance with the desired lengths to which the boards or slats are to be cut. Sizing bar 1 which may, for example, be of a triangular cross section is provided along its lower edge with a longitudinal ledge 5 forming a supporting surface for one end of the cut boards or slats. This ledge 5 carries a plurality of vertical plates or angular rods 4' forming partitions which are secured at their lower ends to the ledge 5 and at their left side or end to sizing bar 1, and every other one of which is placed in alignment with the measuring stops 4 so that between each pair of adjacent measuring stops 4 a pair of open compartments 6 and 7 is formed with a bottom consisting of the ledge 5 and disposed at a level underneath the measuring stops 4. At the end of sizing bar 1 facing toward the saw blade 9, a rakelike member 2 may be pivotably secured thereto as at 2' while at a certain distance from such end of sizing bar 1 a supporting stand 3 may be likewise pivotably connected thereto for supporting the rakelike member 2 and the sizing bar 1. When the entire device is to be transported or stored, the rakelike member 2 and the supporting stand 3 may be pivoted toward the sizing bar 1, while when the latter is set up for operation, members 2 and 3 will be pivoted outwardly to the position shown in Figure 1 and also indicated in dotted lines in Figure 2. The rakelike member 2 is provided with a series of prongs 10 which are spaced from each other in accordance with the distance between the plates or rods 4' and thus form U-shaped supports which are associated with the corresponding compartments 6 and 7 between plates or rods 4' on sizing bar 1 for receiving the boards or slats L after the same have been cut off by saw blade 9 at one end and have then been swung around their respective measuring stops 4 and slipped down into the respective compartments 6 and 7. One end of sizing bar 1 is made of a greater width and rotatably supports the saw blade 9 which is surrounded by a removable hood 8 which is provided with a horizontal supporting surface 11 and a vertical slot 12 permitting the uncut board or slat L to be placed upon surface 11 and then to be moved in a vertical direction upon the saw blade 9. An angular guidearm 13 forms an upward extension of the front edge of the rear wall of slot 12 and reaches entirely over slot 12 so as to prevent the operator of the machine from accidentally reaching into slot 12 and from coming in contact with the saw blade 9. Guide arm 13 has the additional purpose of preventing the end of a slat to be cut from bending upwardly or from being thrown upwardly when coming in contact with the saw blade and after being cut off. The curved shape of guide arm 13 has then the tendency to hold down the cut-off end A of the slat L and prevent it from being thrown upwardly. Guide arm 13 is preferably slightly offset toward the rear of the saw blade 9 so as to give the slat after being cut sufficient clearance to be easily pivoted about its other end which rests against one of the measuring stops 4. The slots are then swung over and inserted into the respective gap between two adjacent rake prongs 10 which corresponds to one of the two compartments 6 or 7 adjacent to and at the right of the respective measuring stop 4 used, and at the same time the slat is slipped off the upper surface of the sizing bar 1 and into the respective compartment to rest either on the ledge 5 and the longitudinal bar of rake member 2 or on other slats previously cut off and placed on ledge 5 and rake member 2.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In combination with a crosscut saw for cutting boards, slats and the like of uneven, unassorted lengths to different specific sizes, a sizing bar mounted adjacent to and at right angles to the plane of the blade of said saw, a plurality of measuring stops on the upper surface of said sizing bar and extending transversely thereof at different distances from said saw blade in accordance with the desired sizes of the boards, and means along one side of said sizing bar for sorting and stacking the boards after being cut to the desired lengths comprising a plurality of compartments below the level of the upper surface of said sizing bar, each associated with and substantially in alignment with one of said measuring stops and extending substantially in the direction of the length of said stop, so that each of said boards after being cut may be pivoted about the respective measuring stop and then be dropped into the respective compartment associated with said stop.

2. The combination saw as defined in claim 1, further comprising an elongated horizontal, inverted rakelike member adapted to be connected to the end of the compartment side of said sizing board near said saw blade, with said rakelike member and said sizing bar normally diverging toward their other, outer ends, said rakelike member having a supporting surface and a plurality of upstanding prongs on said surface.

3. The combination as defined in claim 2, further comprising a supporting stand for supporting said sizing bar and said rakelike member, and means for pivotably connecting said rakelike member and said supporting stand to said sizing bar to permit said member and stand to be pivoted from a collapsed substantially flat position relative to said sizing bar to an angular erected position.

4. The combination as defined in claim 2, wherein said prongs are spaced from each other to form intermediate gaps of a number and width substantially in accordance with the number and width of compartments on said sizing bar.

5. The combination as defined in claim 1 wherein said compartments comprise a longitudinal strip forming the bottoms of said compartments secured to said sizing bar near the lower edge thereof and extending along said bar and projecting toward one side thereof, and vertical partition members secured to said bottom strip and to the side wall of said sizing bar.

6. The combination as defined in claim 5, wherein each measuring stop is associated with a pair of partition members at the side of said stop facing toward said saw blade so as to form two adjacent compartments for each stop.

7. The combination as defined in claim 1, further comprising a protective hood substantially covering said saw blade and having a vertical slot for inserting the board to be cut and for passing the same to said saw blade, and having a horizontal surface adajcent to one edge of said slot for supporting said board and for sliding the same into said slot, and an angular arm mounted on said hood in line with the other edge of said slot and with its free end reaching over said slot at a distance therefrom to allow the board to be cut to be passed toward said slot and to said saw blade only from the side of said horizontal supporting surface and adapted to hold the unwanted end of the board after being cut off.

8. The combination as defined in claim 7, wherein said holding arm is slightly offset relative to the saw blade in the direction toward the unwanted end of the board to be cut.

References Cited in the file of this patent

UNITED STATES PATENTS

| | | |
|---|---|---|
| 725,630 | Smith | Apr. 14, 1903 |
| 957,780 | Leaver | May 10, 1910 |
| 1,740,998 | Pelton | Dec. 24, 1929 |
| 2,662,640 | Dedo | Dec. 15, 1953 |